US005677252A

United States Patent [19]
Gilde et al.

[11] Patent Number: 5,677,252
[45] Date of Patent: Oct. 14, 1997

[54] SION LOW DIELECTRIC CONSTANT CERAMIC NANOCOMPOSITE

[75] Inventors: Gary Gilde, Northeast; Parimal Patel, Bel Air; Clifford Hubbard, Havre de Grace; Brian Pothier, Laurel, all of Md.; Thomas Hynes, Nashua, N.H.; William Croft, Natick, Mass.; Joe Wells, Port Deposit, Md.

[73] Assignee: The United States of America as represented by the Secretary of the Army, Washington, D.C.

[21] Appl. No.: 609,310

[22] Filed: Mar. 1, 1996

[51] Int. Cl.$^6$ .................... C04B 35/596; C04B 35/597
[52] U.S. Cl. ............................ 501/97; 343/872
[58] Field of Search ................ 501/97; 343/872

[56] References Cited

U.S. PATENT DOCUMENTS

| | | | |
|---|---|---|---|
| 369,101 | 2/1887 | Washburn | 501/79 |
| 4,358,772 | 11/1982 | Leggett | 343/872 |
| 4,642,299 | 2/1987 | Hsieh | 501/97 |
| 4,677,443 | 6/1987 | Koetje et al. | 343/872 |
| 5,103,239 | 4/1992 | Verzemnieks et al. | 343/872 |
| 5,483,614 | 1/1996 | Bruck et al. | 501/97 |
| 5,545,362 | 8/1996 | Hirosaki et al. | 501/97 |

Primary Examiner—Karl Group
Attorney, Agent, or Firm—Freda L. Krosnick; Muzio B. Roberto

[57] ABSTRACT

A ceramic nanocomposite made from silicon, oxygen and nitrogen is provided which has a very low dielectric constant, low dielectric loss along with good strength and hardness. The ceramic nanocomposite finds use in millimeter-wave radomes and microwave radomes used on aircraft which must resist erosion from high speed impact with water, ice and dust in the atmosphere.

20 Claims, 1 Drawing Sheet

SION LOW DIELECTRIC CONSTANT CERAMIC NANOCOMPOSITE

GOVERNMENTAL INTEREST

The invention described herein may be manufactured, used and licensed by the Government of the United States of America without payment to the inventor named herein of any royalty thereon.

FIELD OF THE INVENTION

The present invention is directed to a ceramic nanocomposite made from silicon, oxygen and nitrogen, referred to herein as SiON, that offers many advantages over existing materials for Millimeter-Wave Radomes and Microwave Radomes, electromagnetic windows and other applications where a very low dielectric constant and low dielectric loss along with good strength and hardness are needed.

BACKGROUND OF THE INVENTION

Materials for millimeter-wave radomes and microwave radomes must meet several requirements. A radome material needs low dielectric constant and low dielectric loss. Those used on aircraft have additional requirements. A dielectric constant cannot vary by more than 5% over a thousand degrees Celsius and they must have sufficient mechanical strength to withstand the loads from high accelerations, to withstand the high temperature and thermal shock imposed by aerodynamic heating and to withstand high velocity impact with water, ice and small particles in the atmosphere. Two of the most significant requirements are to have a low dielectric constant and for the dielectric constant to have little change with temperature. As the dielectric constant of material changes with temperature, it changes the electrical path length of the radome wall, which increases the transmission loss, boresight error and error slope.

Two approaches have been used to make suitable radomes. One is to use engineered materials that have a low dielectric constant which are relatively stable over a suitable temperature range. The other approach is to actively cool the radome. The latter is not a favored solution because of the complexity and weight it adds to the system.

Ceramic materials that are close candidates for millimeter-wave and microwave radomes have a percent change in dielectric constant at temperatures between 25° C. and 1000° C. that ranges from 3% for fused silica to over 15% for beryllium oxide. Fused silica is an example of a ceramic material which has an extremely low dielectric constant that is very stable with temperature. In addition, it is easy to process. Boron nitride also has excellent electrical properties. However, both fused silica and boron nitride lack the mechanical properties needed for high speed radomes. Additionally, boron nitride oxidizes at elevated temperatures.

Ceramic materials which have been found to have excellent strength and fairly good dielectric properties for millimeter-wave radomes and microwave radomes, typically have been difficult to fabricate into a radome. For example, silicon nitride must either be Hot Isostatically Pressed (HIPed) to achieve full density or heavily doped with sintering aids which increase the dielectric loss and decrease the high temperature strength. Attempts have been made to lower the dielectric properties of silica nitride by mixing it with fused silica and boron nitride. This approach has been taken with Nitroxyceran, which is now considered the benchmark for microwave and millimeter-wave radome materials. However, Nitroxyceran must be HIPed making it costly to produce radomes from this material.

A ceramic material with high strength and excellent electrical properties (low dielectric constant and low dielectric loss) and which is easy to fabricate into a microwave or millimeter-wave radome is desired.

SUMMARY OF THE INVENTION

It is an object of this invention to provide a ceramic material with dielectric constant values which are stable at temperatures in the range of 25° C. to 1000° C. and with low dielectric loss.

It is another object of this invention to provide a ceramic material with mechanical properties suitable for use in millimeter-wave and microwave radomes for aircraft which is easy to fabricate into such radomes.

It is a further object of this invention to provide radomes suitable for use in aircraft which comprise a ceramic material consisting essentially of silicon, oxygen and nitrogen.

Upon further study of the specification and appended claims, further objects and advantages of this invention will become apparent to those skilled in the art.

The above objects are achieved through the ceramic material provided by the present invention which is a multi-phase alloy consisting essentially of silicon, oxygen and nitrogen wherein an alpha-silicon nitride is the dominant phase and which has a dielectric constant of 4.78 at 25° C. and 5.00 at 1000° C.

The ceramic material of this invention is a multi-phase alloy of silicon, oxygen and nitrogen. In its final composition, it is a nanocomposite wherein alpha silicon nitride is the dominant phase. Minor phases are believed to include silicon oxynitride, a nitrogen-rich amorphous silicon phase and possibly some crystalline silicon dioxide. A preferred material exhibits a dielectric constant of 4.78 at 25° C. and 5.0 at 1000° C. The ceramic material has low dielectric loss with a loss tangent of 0.0014. The properties of the ceramic material can be tailored by controlling the oxygen to nitrogen ratio in manufacturing the nanocomposite. The material's strength, hardness, fracture toughness and dielectric properties can be tailored by controlling the oxygen to nitrogen ratio or more precisely, the silicon to oxygen and silicon to nitrogen ratio.

These ceramic materials show high hardness and strength with a hardness of about 1044 kg/mm$^2$. A preferred material is able to withstand a 50 kilogram load on a macro-Vickers indenter without spalling. The load at which spalling occurs in a macro-indenter is often associated with the resistance to erosion and spalling from high speed particle impact which occurs when in use on aircraft. A higher resistance to spalling of a ceramic material indicates that it is more capable of more plastic deformation. A 50 kilogram load in a macro-Vickers indenter is extremely high. Based on this ceramic material's performance in this spalling test, it is expected to have exceptional damage resistance.

A preferred embodiment of the ceramic material of the present invention has the properties given in Table 1.

TABLE 1

Mechanical and Electrical Properties of SiON
Room Temperature Properties:

| Material | Density* (g/cc) | Dielectric Constant | Loss Tangent | Water Adsorption | Hardness $H_{k500\,g}$ | MOR (MPa) |
|---|---|---|---|---|---|---|
| SiON | 2.6 | 4.78 | 0.0014 | 0 | 1044 | 190 |

*No porosity observed at 500x magnification

In addition, to the advantageous physical properties in Table 1, this ceramic material of the present invention exhibits the advantageous electrical properties demonstrated by the data in Table 2 where the temperature dependence of its dielectric properties is demonstrated.

TABLE 2

Temperature Dependence of Dielectric Properties:

| Temperature (°C.) | Dielectric Constant (k) | $K_{temp}/k_{R.T.}$ | Percent Increase in k | Loss Tangent |
|---|---|---|---|---|
| R.T | 4.78 | 1.000 | 0 | 0.0014 |
| 200 | 4.82 | 1.008 | 0.8 | — |
| 630 | 4.90 | 1.025 | 2.5 | — |
| 863 | 4.96 | 1.038 | 3.8 | — |
| 1000 | 5.00 | 1.047 | 4.7 | 0.0025 |

Electrical properties and physical properties of various radome materials are summarized and compared in Table 3 below and the drawing.

TABLE 3

Properties of Candidate Radome Materials

| Material | k(RT) | % Increase @ 1000° C. | Hardness (kg/mm$^2$) | MOR (MPa) |
|---|---|---|---|---|
| Fused Silica | 3.9 | 2.9 | 212–500 | 48 |
| SiON | 4.8 | 4.7 | 1044 | 190 |
| Cordierite | 4.8 | 10.0 | ? | 117 |
| Pyroceram | 5.5 | 7.0 | 698 | 241 |
| Nitroxyceram | 5.8 | 6.1 | 600 | 172 |
| Si$_2$N$_2$O | 6.3 | 5.6 | 1282 | Not Planned |
| BAS/Silicon Nitride | 7.5 | 8.9 | 1232 | 420 |
| Silicon Nitride | 7.5–8.0 | 8.0 | 1450 | 600–1000 |

With the exception of fused silica, the ceramic material of the present invention has a lower, more thermally stable dielectric constant, than other known fully dense materials. Although silica has a lower dielectric constant, the ceramic material of the present invention has improved physical properties, i.e., it is two to five times harder than silica and four times stronger. The increased hardness and strength are critical in the performance of radomes. Since the ceramic material of the present invention is composed of only silicon, nitrogen and oxygen, there are no phases that melt at low temperature and degrade the high temperature strength.

The material can be synthesized from silicon nitride powder which is calcined in the presence of oxygen, preferably air, to add oxygen to the composition. This will enhance its reactivity and allow it to sinter to full density. The silicon nitrides are calcined at temperatures below 1700° C. The temperature and duration of the calcining step determines the level of oxygen addition, i.e., the ratio of oxygen to nitrogen. Adding oxygen to the silicon nitride results in an amorphous silicon oxynitride forming on the surface of the silicon nitride grains. Because the oxygen and nitrogen must diffuse through the amorphous layer to continue the reaction, the resulting powder has a silicon nitride core surrounded by an amorphous silicon oxynitride layer which has nitrogen-rich areas and oxygen-rich areas. This powder can then be sintered to full density using conventional sintering techniques.

As indicated above, this oxygen to nitrogen ratio (silicon to oxygen and silicon to nitrogen ratios) can be controlled by varying the calcining time and temperature. Varying the oxygen to nitrogen ratio allows the composition to be tailored to optimize strength, hardness, fracture toughness and dielectric properties. The material can be sintered to full density without the aid of pressure. This is in contrast to materials such as Nitroxyceram and most silicon nitrides and silicon oxynitrides where densification typically requires hot pressing or Hot Isostatic Pressing (HIPing) or the addition of sintering aids that raise the dielectric constant and dielectric loss.

Because the material can be sintered to full density without the aid of pressure, green parts can be formed from the silicon nitride powder for articles such as radomes and electromagnetic windows, to near net shape by conventional ceramic powder processing such as slipcasting, cold isostatic processing or injection molding. Once the particles in the green part are calcined, they can be sintered to final form. The silicon nitride can be calcined before the powder is fabricated into the green part or after its fabrication. The calcined green part contains between 30% to 45% porosity. The green part can be "green-machined" if desired to refine its shape. Once the desired shape is obtained, the part can be sintered to full or partial density under a nitrogen atmosphere without pressure. The piece formed is typically fully dense with no discernible porosity. If desired, the sintering can be controlled to leave some residual porosity to further reduce the dielectric constant and dielectric loss and change the dielectric constant with temperature.

X-ray diffraction of the sintered product reveals a multi-phase material with silicon nitride being the dominant phase. Not wishing to be bound by theory, it is believed that during sintering, the amorphous material on the surface of the silicon nitride grains pulls the grains together and the amorphous material coalesces into grains. Within these grains, crystalline silicon oxynitride and silicon oxide are believed to nucleate. Transmission Electron Microscopy (TEM) of the sample show grain sizes of from 30 nanometers to 1 micron. The TEM electron diffraction analysis shows no clear diffraction pattern indicating subgrains within the larger grains.

Without further elaboration, it is believed that one skilled in the art can, using the preceding description, utilize the present invention to its fullest extent.

BRIEF DESCRIPTION OF THE DRAWINGS

The figures is a graph plotting the dielectric constant (K) of various materials versus temperature (° C.). The materials reported within the drawing are represented by the following symbols:

| Silicon Nitride | —□— |
| Silicon Oxynitride | —●— |
| Cordierite | —■— |
| Pyroceram 9606 | —○— |
| Nitroxyceram | —■— |
| SiON | —□— |
| Fused silica | —▲— |

Figure 1:
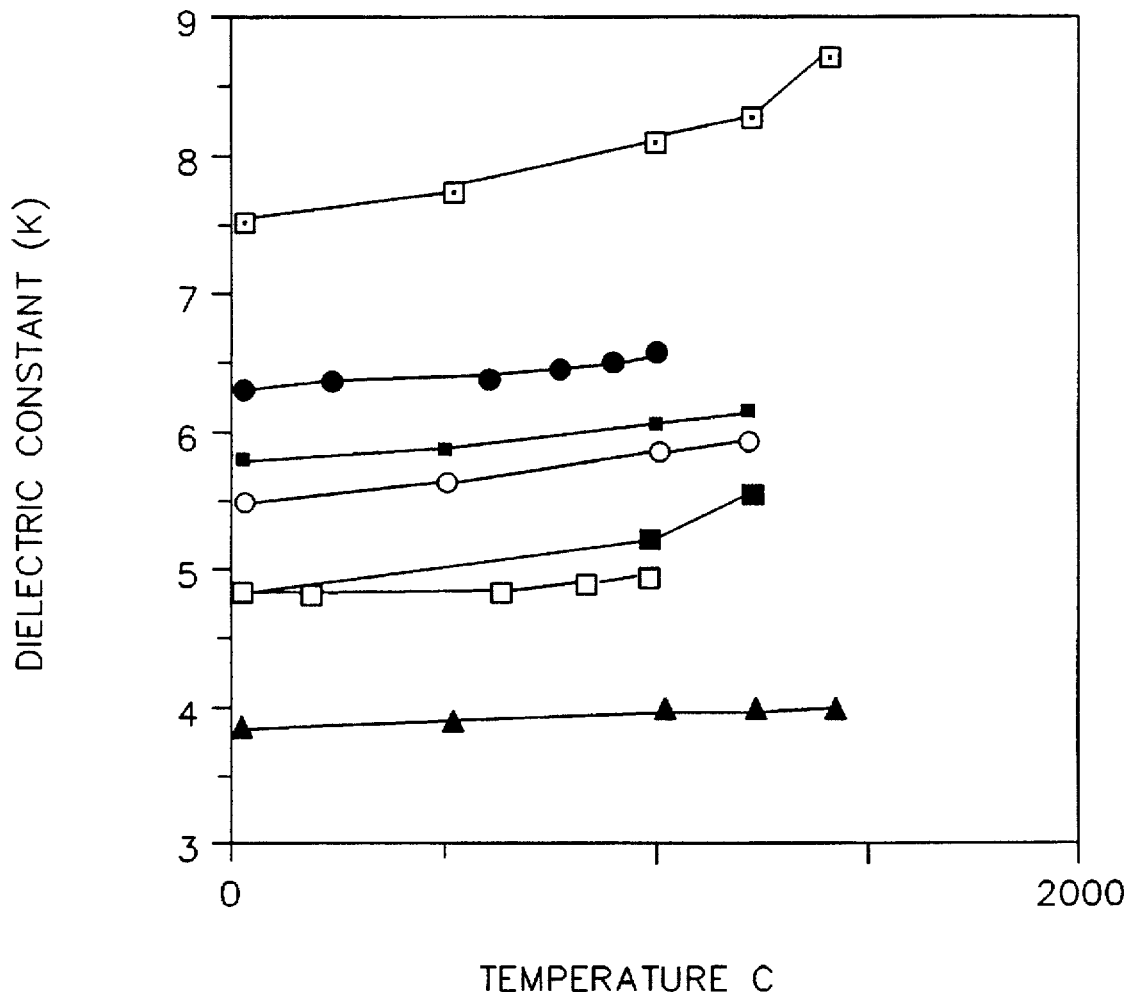

What is claimed:

1. A ceramic material which is a multi-phase alloy consisting essentially of silicon, oxygen and nitrogen, wherein alpha silicon nitride is a dominant phase and which has a dielectric constant of 4.78 at 25° C. and 5.0 at 1000°C.

2. A ceramic material as in claim 1 which has a dielectric loss tangent of 0.0014.

3. A ceramic material as in claim 1 which has a density of about 2.6 g/cm$^3$.

4. A ceramic material as in claim 1 which resists spalling under a 50 kilogram load of a macro-Vickers indenter.

5. A ceramic nanocomposite consisting essentially of silicon, oxygen and nitrogen wherein alpha silicon nitride is a dominant phase and silicon oxynitride is a minor phase.

6. A ceramic nanocomposite as in claim 5 which comprises an additional minor phase of amorphous silica that contains nitrogen.

7. A ceramic nanocomposite as in claim 6 which comprises an additional minor phase of a crystalline silicon dioxide.

8. A ceramic nanocomposite as in claim 5 wherein the nitrogen to oxygen ratio is controlled to provide a dielectric constant of about 4.78 at 25° C. and about 5.0 at 1000° C. with a dielectric loss tangent of about 0.0014.

9. A ceramic nanocomposite as in claim 8 which has a density of about 2.6 g/cm$^3$ and which resists spalling under a 50 kilogram load of a macro-Vickers indenter.

10. A ceramic nanocomposite as in claim 5 in a form of an article selected from the group consisting of microwave radomes, millimeter-wave radomes and electromagnetic windows.

11. A radome for use in aircraft comprised of a ceramic material which is a multi-phase alloy consisting essentially of silicon, oxygen and nitrogen wherein alpha silicon nitride is a dominant phase and silicon oxynitride is a minor phase.

12. A radome for use on aircraft comprised of a ceramic material which consists essentially of silicon, oxygen and nitrogen wherein alpha silicon nitride is a dominant phase and which has a dielectric constant of 4.78 at 25° C. and 5.0 at 1000° C.

13. A radome for use on aircraft as in claim 12 which has a density of about 2.6 g/cm$^3$ and which resists spalling under a 50 kilogram load of a macro-Vickers indenter.

14. A ceramic material which consists essentially of silicon, oxygen and nitrogen, wherein alpha silicon nitride is a dominant component and which is prepared by calcining silicon nitride powder in the presence of oxygen at a temperature below 1700° C. so as to add oxygen in a form of amorphous silicon oxynitride and sintering the calcined silicon nitride powder.

15. A ceramic material as in claim 14 with an oxygen to nitrogen ratio determined by controlling the calcination temperature and the duration of calcination.

16. A ceramic material as in claim 15 which is in a form of a finished article and is prepared by fabricating a green part from the silicon nitride powder prior to calcining, calcining the silicon nitride powder in the presence of oxygen at a temperature less than 1700° C. so as to add oxygen in a form of amorphous silicon oxynitride, and sintering the calcined silicon nitride powder within the green part to densify the green part.

17. A ceramic material as in claim 15 in a form of a finished article, which is prepared by calcining the silicon nitride powder in the presence of oxygen at a temperature less than 1700° C. so as to add oxygen in a form of amorphous silicon oxynitride, fabricating a green part from the calcined silicon nitride powder and sintering the calcined silicon nitride powder to densify the green part.

18. A ceramic material as in claim 15 which is sintered without application of high pressure.

19. A ceramic material as in claim 16 which is in a form of a radome.

20. A ceramic material as in claim 17 which is in a form of a radome.

* * * * *